United States Patent
Fujioka

Patent Number: 5,405,438
Date of Patent: Apr. 11, 1995

[54] HOT MELT INK FOR INK JET PRINTERS
[75] Inventor: Masaya Fujioka, Nagoya, Japan
[73] Assignee: Brother Kogyo Kabushiki Kaisha, Nagoya, Japan
[21] Appl. No.: 225,296
[22] Filed: Apr. 8, 1994
[30] Foreign Application Priority Data Apr. 26, 1993 [JP] Japan .................. 5-099599

[51] Int. Cl.[6] .................................. C09D 11/02
[52] U.S. Cl. .................... 106/27 B; 106/31 A
[58] Field of Search ............. 106/23 A, 27 R, 27 A, 106/27 B, 31 A

[56] References Cited

U.S. PATENT DOCUMENTS

| | | | |
|---|---|---|---|
| 4,390,369 | 6/1983 | Merritt et al. | 106/31 R |
| 4,659,383 | 4/1987 | Lin et al. | 106/27 R |
| 4,822,418 | 4/1989 | Lin et al. | 106/27 R |
| 5,066,332 | 11/1991 | Brown et al. | 106/31 A |
| 5,286,288 | 2/1994 | Tobias et al. | 106/23 A |

FOREIGN PATENT DOCUMENTS 0099682  2/1984  European Pat. Off. .

Primary Examiner—Helene Klemanski
Attorney, Agent, or Firm—Oliff & Berridge

[57] ABSTRACT

A hot melt ink for ink jet printers includes a vehicle that is solid at normal temperatures and which melts and liquifies when heated above its melting point, a pigment, and an aluminate coupling agent in an amount of about 1 to 50 weight percent, based on the weight of the pigment.

15 Claims, 1 Drawing Sheet

HOT MELT INK FOR INK JET PRINTERS

BACKGROUND OF THE INVENTION

1. Field of the Invention

The present invention relates to hot melt ink for an ink jet printer and, more particularly, to hot melt ink for an ink jet printer which is solid at normal temperatures and is used for printing after being thermally melted at temperatures higher than normal temperatures.

2. Description of Related Art

Ink jet printers have many advantages in printing techniques, such as noiselessness, high speed, high quality and coloration. However, ink droplets jetted from a nozzle are directly deposited on recording paper, causing the print quality and print drying time to be influenced depending on the type of recording paper. If low-quality paper is used for recording, a considerable deterioration in quality of the resultant print has been experienced.

It is known that in order to solve the above problem, hot melt ink which has a melting point higher than room temperature is used, achieving print of a uniform dot size irrespective of the type of recording paper. Ink compositions that melt above room temperature have been proposed, including ink containing natural wax as disclosed in U.S. Pat. No. 4,390,369 ink containing stearic acid, as disclosed in European Unexamined Patent Publication No. 99,682, and ink containing a $C_{20}$–$C_{24}$ acid or alcohol along with a ketone having a relatively high melting point, as disclosed in U.S. Pat. No. 4,659,383, in which all the inks make use of dyes as a coloring material. Moreover, in U.S. Pat. Nos. 4,659,383 and 4,822,418 hot melt inks are disclosed in which solid pigments are dispersed in waxes or $C_{18}$–$C_{24}$ fatty acids having a melting point higher than 65° C.

However, the known hot melt inks for ink jet printers described above have problems such as the degree of dye solubility when dyes are used as the coloring material. This limits the type of dyes that may be used. In addition, the ink cannot necessarily be kept as stabilized on heating over a long time or on repetition of heating and cooling cycles, coupled with another problem involved in the ink's color fastness to light. On the other hand, when pigments are used as the coloring material, good color fastness to light is attained but the pigment's dispersability and the stability of the dispersed pigment are not always satisfactory, with the unlikelihood that the ink's storage stability under heating conditions is good.

SUMMARY OF THE INVENTION

The invention provides a hot melt ink having good dispersability, good dispersion stability and color fastness to light. Therefore, the hot melt ink of the invention prevents clogging of orifices of an ink jet head and provides stable ink ejecting.

In order to achieve the above object of the invention, there is provided a hot melt ink for an ink jet printer, which is solid at normal temperatures and used after being melted with heat, comprising: a vehicle that is solid at normal temperatures and which melts and liquifies when heated above its melting point; a pigment as a coloring material; and an aluminate coupling agent which is present in an amount from about 1 to 50 wt. % based on the weight of the pigment.

In the above hot melt ink for ink jet printers, the vehicle is a dispersion solvent of the pigment which is solid at normal temperatures and melted by thermal energy. At temperatures higher than its melting point, the vehicle is converted into a liquid having a viscosity suitable for jetting the ink. The vehicle is thermally stable at an ink jetting temperature.

As is clear from the above explanation, the hot melt ink for an ink jet printer of the present invention comprises a vehicle which is solid at normal temperatures and which melts and liquefies if heated above its melting point, a pigment as a coloring material, and an aluminate coupling agent which is present in an amount from about 1 to 50 wt. % based on the weight of the pigment. Therefore, the ink has good dispersability, pigment dispersion stability, and prevents the orifices in an ink jet head from clogging. The ink also has stable ink ejecting and good color fastness to light properties.

BRIEF DESCRIPTION OF THE DRAWING

Preferred embodiments of the present invention will be described in detail with reference to the accompanying drawing, wherein.

DETAILED DESCRIPTION OF PREFERRED EMBODIMENTS

Figure 1:
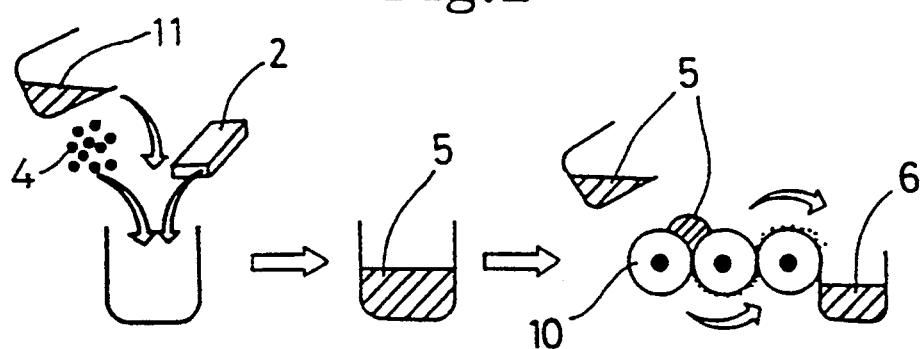
FIG. 1 shows a procedure for preparing an ink according to the preferred embodiments.
Figure 1:
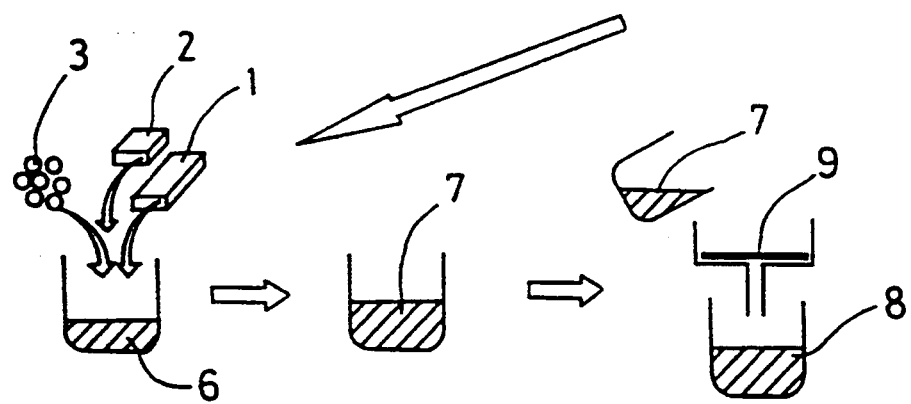

Hereafter, preferred embodiments of the invention are explained.

A hot melt ink for ink jet printers of this embodiment has a vehicle which is solid at normal temperatures and which melts by application of heat energy, a pigment as a coloring material, and an aluminate coupling agent in an amount of about 1 to 50 wt. % based on the weight of the pigment.

The vehicle should preferably have a melting point not lower than about 50° C., more preferably, not lower than 60 ° C. and, most preferably, not lower than 70° C., when measured according to the melting point testing method described in JIS K2235.

Various materials can be used as the vehicle, for example, a normal temperature solid wax is preferred.

For example, there may be mentioned petroleum waxes, of which paraffin waxes or microcrystalline waxes are preferred; mineral waxes, of which montan wax, ozocerite or ceresine is preferred; plant waxes, of which candelilla wax, carnauba wax, rice wax, jojoba solid wax and the like are preferred; animal waxes, of which beeswax, lanolin, whale oil and the like are preferred; mineral waxes, of which montan wax is preferred; synthetic hydrocarbons, of which Fischer-Tropsch waxes or polyethylene waxes are preferred; hydrogenated waxes, of which hardened castor oil or hardened castor oil derivatives are preferred; modified waxes, of which montan wax derivatives, paraffin wax derivatives, microcrystalline wax derivatives or polyethylene wax derivatives are preferred; higher fatty acids, of which behenic acid, stearic acid, palmitic acid, myristic acid, or lauric acid is preferred; higher alcohols, of which stearyl alcohol, behenyl alcohol or the like is preferred; hydroxystearic acids, of which 12-hydroxystearic acid or 12-hydroxystearic acid derivatives are preferred; ketones, of which stearone or laurone is preferred; fatty acid amides, of which lauric acid amide, stearic acid amide, oleic acid amide, erucic acid amide, ricinoleic acid amide, 12-hydroxystearic acid amide, specific types of fatty acid amides or N-substituted fatty acid amides are preferred; amines, of which dodecylamine, tetradecylamine or octadecylamine is preferred; esters, of which methyl stearate, octadecyl stearate, glycerine and fatty acid esters, sorbitan and fatty acid esters, propylene glycol and fatty acid esters, ethylene glycol and fatty acid esters, polyoxyethylene and fatty acid esters are preferred; and polymerized waxes, of which α-olefin-maleic acid copolymer waxes are preferred. These waxes may be used singly or in combinations of two or more.

When waxes having a small polarity such as paraffin waxes, microcrystalline waxes, ozocerite, ceresine, polyethylene waxes, Fischer-Tropsch waxes, stearone, laurone, methyl stearate or octadecyl stearate are used, it is preferable to use waxes having a small polarity mixed with other waxes having a relatively great polarity.

The following additives can be added to the vehicle. Examples of useful additives include self-adhesion or adhesion imparting agents, viscosity modifiers, heat characteristic modifiers, surface tension modifiers and the like. These additives should preferably be present in an amount from 0 to about 49 wt. %.

The vehicle should preferably be present in an amount from about 50 to 99 wt. % based on the weight of the ink.

The pigment (coloring material) is present in the vehicle in the condition of a fine dispersion and has the characteristics of coloring materials. The type of pigment is not critical, and inorganic and organic pigments may be arbitrarily selected. In this connection, however, in order to develop the effects of the invention significantly, carbon black is preferable for an inorganic pigment. Organic pigments useful in the present invention include quinacridone organic pigments, phthalocyanine organic pigments and iso-indolinone organic pigments. These pigments may be used singly or in combinations of two or more. For color control, dyes may be added to the pigments.

The pigment is preferably present in an amount from about 1 to 10 wt. % based on the weight of the ink, to provide a suitable printing density, more preferably from about 1 to 8 wt. %, and most preferably from about 1.5 to 6 wt. %.

The aluminate coupling agent is chemically bonded on the surface of the pigments to make the pigments into fine particles and to stabilize the dispersability of the pigments.

A preferred example of the aluminate coupling agent is acetoalchoxy aluminum dialkylate having the following formula:

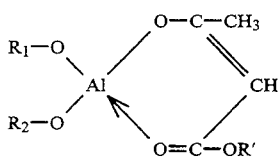

wherein $R_1$, $R_2$ and $R'$ represent alkyl groups.

A more preferred aluminate coupling agent is acetoalchoxy aluminum diisopropylate having the following formula:

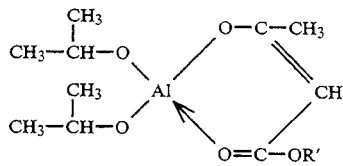

wherein $R'$ represents alkyl groups.

The aluminate coupling agent is necessarily present in an amount from about 1 to 50 wt. % based on the weight of the pigments. If the coupling agent is present in an amount of less than 1 wt. %, the pigments' dispersability is not stabilized. If the coupling agent is present in an amount more than 50 wt. %, the coupling agent reacts with ink components other than the pigments and causes gelling problems. The aluminate coupling agent is preferably present in an amount from about 1 to 50 wt. % based on the weight of the pigments, more preferably from about 1 to 30 wt. %, much more preferably from about 2 to 20 wt. %, most preferably from about 3 to 15 wt. %. It is preferable that the total amount of the pigments and the aluminate coupling agent is from about 1 to 15 wt. % based on the weight of the ink.

The hot melt ink for ink jet printers can be prepared in the following manner.

Initially, a vehicle, a pigment and aluminate coupling agent are mixed. The resultant mixture in a melted state is subjected to a dispersing machine such as a three-roll mill, an attritor, a ball mill or a colloid mill, thereby converting the pigment into fine particles to thus obtain a dispersion. Finally, the dispersed composition in the form of a hot liquid is passed through a 10 μm or smaller mesh filter, to obtain a final ink.

Hereafter, preferred examples of hot melt inks for ink jet printers according to the present invention are described.

EXAMPLE 1

Normal temperature solid waxes used as a vehicle are microcrystalline wax (Hi-Mic 2065 manufactured by NIPPON SEIRO CO., LTD.) and a paraffin wax derivative (HAD 5080 manufactured by NIPPON SEIRO CO., LTD.). A petroleum resin (NEOPOLYMER S manufactured by NIPPON PETROCHEMICALS CO., LTD.) is used as a self-adhesion or adhesion imparting agent. Carbon black (MA-100 manufactured by Mitsubishi Kasei Corporation) is used as a pigment. Acetoalchoxy aluminum diisopropylate (PLENACT AL-M manufactured by AJINOMOTO CO., LTD.) is used as an aluminate coupling agent.

The ink composition of Example 1 has the following formulation:

| | |
|---|---|
| Hi-Mic 2065 | 73 parts by weight |
| HAD 5080 | 19.8 parts by weight |
| NEOPOLYMER S | 5 parts by weight |
| MA-100 | 2 parts by weight |
| PLENACT AL-M | 0.2 parts by weight |

The ink can be prepared in the procedure illustrated in FIG. 1. Initially, a paraffin wax derivative 2 (56 parts by weight) and carbon black 4 (40 parts by weight) and acetoalchoxy aluminum diisopropylate 11 (4 parts by weight) were mixed under heating conditions at 100° C. The resultant mixture 5 is passed three times through three-roll mill 10 manufactured by INOUE MFG INC., which is a temperature-controlled three-roll mill under heating conditions of 80° C., thereby obtaining a dispersion.

Subsequently, the dispersion 6 (5 parts by weight) is thermally melted at 120° C., into which 73 parts by weight of microcrystalline wax 1, 17 parts by weight of the paraffin wax derivative 2 and 5 parts by weight of the petroleum resin 3 are added, followed by mixing under agitation.

Two or three drops of the resultant composition 7 are melted on a glass slide heated to 120° C., on which a glass cover plate is placed and pressed slightly, followed by observation through a microscope (XF-UNR manufactured by NIKON CORPORATION) using transmitted light. As a result, few particles are found in the melted state. This reveals that substantially all of the carbon black particles 4 are finely dispersed in size not larger than 1 $\mu$m; thus, the pigment's dispersability is good.

The composition 7 is sealed in a heat-proof container made of glass and kept in the container at 125° C. for 30 days. As a result, the pigments did not have any sedimentation, and thus the pigment's dispersion stability is good.

The composition 7 is filtered through a 1-$\mu$m mesh filter 9 of a heating filtration device manufactured by ADVANTEC TOYO CO., LTD., to obtain a final hot melt ink 8.

The thus obtained hot melt ink 8 of Example 1 is usable as a hot melt ink for an ink jet printer. The hot melt ink 8 is black in color and solid at normal temperatures and is liquefied at temperatures not lower than 75° C.

Hot melt inks are prepared in the same manner as described above with the amount of acetoalchoxy aluminum diisopropylate being each of 1 wt. %, 5 wt. %, 20 wt. % and 50 wt. %, based on the weight of the pigment. As a result, the same pigment dispersability and pigment dispersion stability could be obtained for all the inks.

EXAMPLE 2

Normal temperature solid waxes used are polyethylene wax (MITSUI HI-WAX 110 manufactured by Mitsui Petrochemical Industries) and a stearic acid amide (FATTY ACID AMIDE S manufactured by Kao Corporation). Acetoalchoxy aluminum diisopropylate is used as an aluminate coupling agent. A quinacridone pigment (HOSTAPERM PINK E02 TONERGRADE manufactured by Hoechst) is provided as a pigment.

The ink composition of Example 2 has the following formulation:

| | |
|---|---|
| MITSUI HI-WAX 110 | 86.7 parts by weight |
| FATTY ACID AMIDE S | 10 parts by weight |
| PLENACT AL-M | 0.3 parts by weight |
| HOSTAPERM PINK E02 | 3 parts by weight |

The hot melt ink of Example 2 can be prepared in the following procedure. Initially, 67 parts by weight of the fatty acid amide S and 3 parts by weight of the PLENACT AL-M and 30 parts by weight of HOSTAPERM PINK E02 are melted under heating conditions of 100° C. and mixed. The resultant mixture is passed four times through a three-roll mill under heating conditions of 85° C., thereby obtaining a dispersion.

Subsequently, 10 parts by weight of the dispersion are thermally melted at 120° C., to which 86.7 parts by weight of MITSUI HI-WAX 110 and 3.3 parts by weight of the fatty acid amide are added, followed by mixing under agitation.

Two or three drops of the resultant composition are melted on a glass slide heated to 120° C., on which a glass cover plate is placed and pressed slightly, followed by observation through a microscope (XF-UNR) using transmitted light. As a result, few particles are found in the melted state. This reveals that substantially all of the red quinacridone pigment, HOSTAPERM PINK E02, is finely dispersed in size not larger than 1 $\mu$m; thus, the pigment's dispersability is good.

The composition is sealed in a heat-proof container made of glass and kept in the container at 125° C. for 30 days. As a result, the pigments did not have any sedimentation, and thus the pigment's dispersion stability is good.

The composition is filtered through a 1 $\mu$m mesh filter of a heating filtration device manufactured by ADVANTEC TOYO CO., LTD., to obtain a final hot melt ink.

The thus obtained hot melt ink of Example 2 is usable as a hot melt ink for an ink jet printer. The hot melt ink is red in color, solid at a normal temperatures, and is liquefied at temperatures not lower than 100° C.

EXAMPLE 3

A normal temperature solid wax used as a vehicle is stearone (KAO WAX T-1 manufactured by Kao Corporation). PLENACT AL-M is used as an aluminate coupling agent. A phthalocyanine pigment (HELIOGEN BLUE K6911D manufactured by BASF) is provided as a pigment.

The ink composition of Example 3 has the following formulation:

| | |
|---|---|
| KAO WAX T-1 | 97.9 parts by weight |
| PLENACT AL-M | 0.1 parts by weight |
| HELIOGEN BLUE K6911D | 2 parts by weight |

The hot melt ink of Example 3 can be prepared in the following procedure. Initially, 58 parts by weight of KAO WAX t-1, 2 parts by weight of PLENACT AL-M, and 40 parts by weight of HELIOGEN BLUE K6911D are mixed at 90° C., followed by passage three times through a three-roll mill at 90° C. to form a dispersion.

5 parts by weight of the dispersion are heated to 120° C., to which 95 parts by weight of KAO WAX T-1 is added, followed by mixing under agitation.

Two or three drops of the resultant composition are melted on a glass slide heated to 120° C., on which a glass cover plate is placed and pressed slightly, followed by observation through a microscope (XF-UNR) using transmitted light. As a result, few particles are found in the melted state. This reveals that substantially all of the blue phthalocyanine pigment, HELIOGEN BLUE K6911D, is finely dispersed in size not larger than 1 $\mu$m. Thus, the pigment's dispersability is good.

The composition is sealed in a heat-proof container made of glass and kept in the container at 125° C. for 30 days. As a result, the pigments did not have any sedimentation, and thus the dispersion stability of the pigment is good.

The composition is filtered through a 1 $\mu$m mesh filter of a heating filtration device manufactured by ADVANTEC TOYO CO., LTD., to obtain a final hot melt ink.

The thus obtained hot melt ink of Example 3 is usable as a hot melt ink for an ink jet printer. The hot melt ink is blue in color, solid at normal temperatures, and is liquefied at temperatures not lower than 80° C.

EXAMPLE 4

A normal temperature solid wax used as a vehicle is a polyethylene wax derivative (POWAX H-10 manufactured by NIPPON OIL COMPANY, LIMITED). PLENACT AL-M is used as an aluminate coupling agent. An iso-indolinone pigment (PALIOTOL YELLOW D1155 manufactured by BASF) is provided as a pigment.

The ink composition of Example 4 has the following formulation:

| | |
|---|---|
| POWAX H-10 | 94.2 parts by weight |
| PLENACT AL-M | 0.8 parts by weight |
| PALIOTOL YELLOW D1155 | 5 parts by weight |

The hot melt ink of Example 4 can be prepared using the following procedure. Initially, 50 parts by weight of POWAX and 50 parts by weight of PALIOTOL YELLOW D1155 are melted under heating conditions of 100° C. and mixed. The resultant mixture is passed three times through a three-roll mill under heating conditions of 75° C., thereby obtaining a dispersion.

Subsequently, 10 parts by weight of the dispersion are heated to 120° C., into which 89.2 parts by weight of POWAX and 0.8 parts by weight of PLENACT AL-M are added, followed by mixing under agitation.

Two or three drops of the resultant composition are melted on a glass slide heated to 120° C., on which a glass cover plate is placed and pressed slightly, followed by observation through a microscope (XF-UNR) using transmitted light. As a result, few particles are found in the melted state. This reveals that substantially all of the yellow iso-indolinone pigment, PALIOTOL YELLOW D1155, is finely dispersed in size not larger than 1 $\mu$m. Thus, the dispersability of the pigment is good.

The composition is sealed in a heat-proof container made of glass and kept in the container at 125° C. for 30 days. As a result, the pigments did not have any sedimentation, and thus the pigment's dispersion stability is good.

Thus, if PLENACT AL-M as an aluminate coupling agent is added to the dispersion after the pigment dispersion, the pigment dispersion stability is good.

The composition is filtered through a 1 $\mu$m mesh filter of a heating filtration device manufactured by ADVANTEC TOYO CO., LTD., to obtain a final hot melt ink.

The thus obtained hot melt ink of Example 4 is usable as a hot melt ink for an ink jet printer. The hot melt ink is yellow in color, solid at normal temperatures, and is liquefied at temperatures not lower than 65° C.

COMPARATIVE EXAMPLE 1

The ink of Comparative Example 1 has the following formulation:

| | |
|---|---|
| HNP-10 (paraffin wax) | 93 parts by weight |
| EVA210 (ethylene-vinyl acetate copolymer resin) | 5 parts by weight |
| MA-100 (carbon black) | 2 parts by weight |

The hot melt ink of Comparative Example 1 can be prepared in the following manner. 60 parts by weight of HNP-10 and 40 parts by weight of MA-100 are mixed under heating conditions of 100° C., followed by passage three times through a three-roll mill under heating conditions of 78° C., to obtain a dispersion.

5 parts by weight of the dispersion are heated to 120° C., to which 90 parts by weight of HNP-10 and 5 parts by weight of EVA210 are added and mixed under agitation.

Two or three drops of the resultant composition are placed and melted on a glass slide heated to 120° C., on which a glass cover is placed and pressed slightly, followed by observation through a microscope (XF-UNR) using transmitted light. As a result, the MA-100 pigment is found to be present substantially in the form of large particles in size not smaller than 1 $\mu$m. Thus, it has been found that with the composition of Comparative Example 1, the pigment is not satisfactorily dispersed.

The thus obtained hot melt ink of Comparative Example 1 lacks an aluminate coupling agent, so that the pigment cannot be dispersed to a satisfactory extent and satisfactory pigment dispersion stability cannot be obtained. Thus, the ink cannot be used as a hot melt ink for ink jet printers.

COMPARATIVE EXAMPLE 2

The ink of Comparative Example 2 has the following formulation:

| | |
|---|---|
| Hi-Mic 2065 | 97 parts by weight |
| HOSTAPERM PINK E02 | 3 parts by weight |

The hot melt ink of Comparative Example 2 can be prepared in the following manner. 70 parts by weight of Hi-Mic 2065 and 30 parts by weight of HOSTAPERM PINK E02 are mixed under heating conditions of 100° C., followed by passage three times through a three-roll mill under heating conditions of 75° C. to obtain a dispersion.

10 parts by weight of the dispersion are heated to 120° C., into which 90 parts by weight of Hi-Mic 2065 are added and mixed under agitation.

Two or three drops of the resultant composition are placed and melted on a glass slide heated to 120° C., on which a glass cover is placed and pressed slightly, followed by observation through a microscope (XF-UNR) using transmitted light. As a result, the HOSTAPERM PINK E02 pigment is found to be present substantially in the form of large particles in size not smaller than 1 $\mu$m. Thus, it has been found that with the composition of Comparative Example 2, the pigment is not satisfactorily dispersed.

The thus obtained hot melt ink of Comparative Example 2 lacks an aluminate coupling agent, so that the pigment cannot be dispersed to a satisfactory extent and satisfactory pigment dispersion stability cannot be obtained. Thus, the ink cannot be used as a hot melt ink for ink jet printers.

COMPARATIVE EXAMPLE 3

The ink of Comparative Example 3 has the following formulation:

| KAO WAX T-1 | 96 parts by weight |
| --- | --- |
| PLENACT AL-M | 2 parts by weight |
| HELIOGEN BLUE K6911D | 2 parts by weight |

The hot melt ink of Comparative Example 3 can be prepared in the following manner. 20 parts by weight of KAO WAX T-1, 40 parts by weight of PLENACT AL-M, and 40 parts by weight of HELIOGEN BLUE K6911D are mixed at 90° C., followed by passage three times through a three-roll mill at 90° C.

5 parts by weight of the resultant dispersion are heated to 120° C., into which 95 parts by weight of KAO WAX T-1 is added and mixed under agitation.

Two or three drops of the resultant composition are placed and melted on a glass slide heated to 120° C., on which a glass cover is placed and pressed slightly, followed by observation through a microscope (XF-UNR) using transmitted light. As a result, few particles are observed and substantially all of the pigment, HELIOGEN BLUE K6911D, is found to be finely dispersed in size not larger than 1 μm, with good pigment dispersability.

The composition is filtered through a 1 μm mesh filter of a heating filtration device manufactured by ADVANTEC TOYO CO., LTD., to obtain a final hot melt ink.

However, the thus obtained hot melt ink of Comparative Example 3 is not liquefied but instead gells in a heated condition. Thus, the ink cannot be used as a hot melt ink for ink jet printers. In Example 3, since the amount of the aluminate coupling agent was 100 parts by weight based on the weight of the pigment, which is too much, the coupling agent reacted with the ink components other than the pigments.

COMPARATIVE EXAMPLE 4

The ink of Comparative Example 4 has the following formulation:

| POWAX H-10 | 98 parts by weight |
| --- | --- |
| PALIOTOL YELLOW D1155 | 2 parts by weight |

The hot melt ink of Comparative Example 4 can be prepared in the following manner. 60 parts by weight of POWAX and 40 parts by weight of PALIOTOL YELLOW D1155 are mixed under heating conditions of 100° C., followed by passage three times through a three-roll mill under heating conditions of 75° C.

5 parts by weight of the resultant dispersion are heated to 120° C., into which 95 parts by weight of POWAX are added and mixed under agitation.

Two or three drops of the resultant composition are placed and melted on a glass slide heated to 120° C., on which a glass cover is placed and pressed slightly, followed by observation through a microscope (XF-UNR) using transmitted light. As a result, few particles are observed and substantially all of the pigment, PALIOTOL YELLOW D1155, is found to be finely dispersed in size not larger than 1 μm with good pigment dispersability.

The composition is sealed in a heat-proof container made of glass and kept in the container at 125° C. for 30 days. As a result, the pigments did not have any sedimentation, and thus the dispersion stability of the pigment is good.

The composition is filtered through a 1 μm mesh filter of a heating filtration device manufactured by ADVANTEC TOYO CO., LTD., to obtain a final hot melt ink.

The thus obtained hot melt ink of Comparative Example 4 may be used as a hot melt ink for ink jet printers. However, since the aluminate coupling agent is not present, the ink becomes poor in the pigment dispersion stability. Owing to the poor dispersion stability, when the ink is used in a hot liquefied state over a long time, problems arise such as changes in print color, clogging of the orifice of a printing head, and changes in the ink's physical properties.

Thus, according to the invention, hot melt inks are provided which have good pigment dispersability and dispersion stability, good coloring power, and good color fastness to light. When the inks are used over a long time, no problem is raised owing to the coagulation and sedimentation of the pigment.

On the other hand, if the ink lacks an aluminate coupling agent, or the amount of the coupling agent is over 50 wt. % based on the weight of the pigment, as shown in the Comparative Examples, the pigments are not dispersed, the pigment dispersion stability cannot be obtained, or the ink itself is gelled.

Moreover, if the ink lacks a vehicle, the resultant hot melt ink may lose its property of being solid at normal temperatures. If the ink lacks pigments, the resultant hot melt ink loses good coloring power and good color fastness to light.

What is claimed is:

1. A hot melt ink for ink jet printers, comprising:
a vehicle that is solid at normal temperatures and which melts and liquifies when heated above its melting point;
a pigment; and
an aluminate coupling agent in an amount from about 1 to 50 wt. %, based on the weight of the pigment.

2. A hot melt ink according to claim 1, wherein said aluminate coupling agent is an acetoalchoxy aluminum dialkylate.

3. A hot melt ink according to claim 2, wherein said aluminate coupling agent is acetoalchoxy aluminum diisopropylate.

4. A hot melt ink according to claim 3, wherein said aluminate coupling agent is present in an amount of about 1 to 30 wt. %, based on the weight of the pigment.

5. A hot melt ink according to claim 1, wherein said vehicle includes a normal temperature solid wax in an amount from about 50 to 99 wt. %, based on the weight of the ink.

6. A hot melt ink according to claim 1, wherein said pigment is present in an amount of about 1 to 10 wt. %, based on the weight of the ink.

7. A hot melt ink according to claim 1, wherein said aluminate coupling agent is present in an amount of about 1 to 30 wt. %, based on the weight of the pigment.

8. A hot melt ink according to claim 7, wherein said aluminate coupling agent and said pigment are present in a total amount of about 1 to 15 wt. %, based on the weight of the ink.

9. A hot melt ink according to claim 1, wherein the pigment is carbon black.

10. A hot melt ink according to claim 1, wherein the pigment is an organic pigment selected from the group consisting of quinacridone organic pigments, phthalocyanine organic pigments, and iso-indolinone organic pigments.

11. A hot melt ink according to claim 1, wherein the vehicle has a melting point not lower than about 50° C.

12. A hot melt ink for ink jet printers, comprising:
a vehicle that is solid at normal temperatures and which melts and liquifies when heated above its melting point, said vehicle comprising a normal temperature solid wax in an amount from about 50 to 99 wt. %, based on the weight of the ink;
a pigment; and
an aluminate coupling agent comprising an acetoalchoxy aluminum dialkylate in an amount from about 1 to 50 wt. %, based on the weight of the pigment.

13. A hot melt ink according to claim 12, wherein said aluminate coupling agent is acetoalchoxy aluminum diisopropylate.

14. A hot melt ink according to claim 13, wherein said aluminate coupling agent is present in an amount of about 1 to 30 wt. %, based on the weight of the pigment.

15. A hot melt ink according to claim 14, wherein said aluminate coupling agent and said pigment are present in a total amount of about 1 to 15 wt. %, based on the weight of the ink.

* * * * *